(12) United States Patent
Alreck

(10) Patent No.: US 6,371,584 B1
(45) Date of Patent: Apr. 16, 2002

(54) SCALE DRAWER ADAPTED FOR UNDER CABINET MOUNTING

(76) Inventor: Oden R. Alreck, P.O. Box 66, Knife River, MN (US) 55609

( * ) Notice: Subject to any disclaimer, the term of this patent is extended or adjusted under 35 U.S.C. 154(b) by 0 days.

(21) Appl. No.: 09/819,226

(22) Filed: Mar. 28, 2001

(51) Int. Cl.$^7$ ............................................... A47B 83/00
(52) U.S. Cl. .................................... 312/235.1; 312/278
(58) Field of Search ............................. 312/235.1, 278, 312/330.1, 333, 204, 228, 902, 319.1, 319.5, 319.7, 319.8, 317.1, 317.2

(56) References Cited

U.S. PATENT DOCUMENTS

| | | |
|---|---|---|
| 1,887,986 A | 11/1932 | Baldwin |
| 2,181,272 A | 11/1939 | Greenleaf |
| 2,872,178 A | 2/1959 | Holland |
| 2,924,443 A | 2/1960 | Townsend et al. |
| 3,027,215 A * | 3/1962 | Duncan ....................... 312/245 |
| 3,097,712 A | 7/1963 | Johnson |
| 3,854,785 A * | 12/1974 | Manner et al. .......... 312/319.1 |
| 4,165,124 A * | 8/1979 | Olan ........................ 312/235.6 |
| 4,288,131 A | 9/1981 | Griffin |
| 4,545,628 A * | 10/1985 | Richey ..................... 312/235.1 |
| 5,277,487 A * | 1/1994 | Simon ..................... 312/228 X |
| 5,706,678 A * | 1/1998 | Sasaki ..................... 312/228 X |
| 5,755,498 A * | 5/1998 | Cutler ..................... 312/278 X |
| 5,857,757 A * | 1/1999 | Bieker et al. ........... 312/902 X |
| 6,224,176 B1 * | 5/2001 | Suzuki ........................ 312/278 |

FOREIGN PATENT DOCUMENTS

DE             131602       * 12/1900   .............. 312/235.1

* cited by examiner

Primary Examiner—James O. Hansen

(57) ABSTRACT

A drawer mounted on a drawer housing which is attached to the base plate of a cabinet, the drawer being sized to contain a bathroom scale, and being movable inwardly and outwardly by attachment to telescopic drawer glides. A hinged door is mounted to the drawer housing to cover the drawer when in a closed position. An alternative provides and electro-mechanical connection to the drawer, to enable opening and closing of the drawer by activation of an electrical motor.

13 Claims, 3 Drawing Sheets

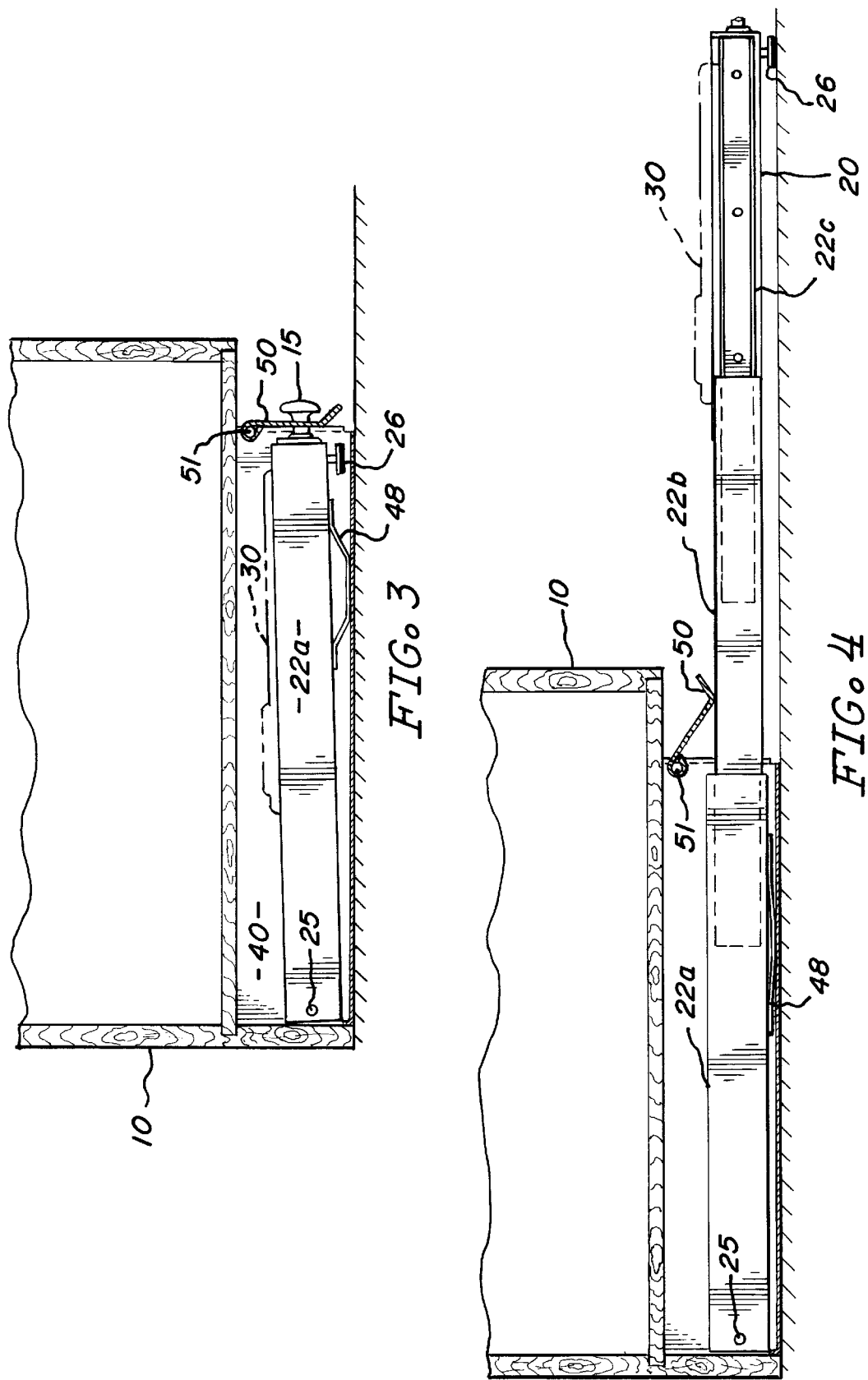

(ALTERNATE)

SCALE DRAWER ADAPTED FOR UNDER CABINET MOUNTING

BACKGROUND OF THE INVENTION

The present invention relates to an apparatus for mounting to the base of a cabinet of the type commonly used in residential kitchens or bathrooms, for supporting a scale and providing a sliding drawer for moving the scale outwardly from the cabinet or inwardly to a secured position under the cabinet.

Any conventional cabinet of the type commonly used in residential or commercial construction can be easily adapted for receiving the present invention. Such cabinets typically have a recessed base portion supporting a storage cabinet which may have slidable drawers or hinged doors enclosing a storage volume. The base portion typically measures about 3½ inches in height and at least about 18 inches in depth, with a standard cabinet width—usually between 13½ and 16 inches. To adapt a cabinet to receive the invention requires only that a portion of the front base plate of the cabinet be removed; the size of the removed base plate portion corresponds to the external dimensions of the slidable drawer corresponding to the present invention. When the base plate portion is removed, an under-cabinet volume is revealed which is an unobstructed opening of a size which easily receives the present invention.

SUMMARY OF THE INVENTION

The present invention comprises an apparatus for attachment to a conventional cabinet, having a drawer for holding a scale, commonly referred to as a bathroom scale. The drawer is mounted to a pair of telescoping drawer glides, and one end of each glide is attachable to the interior of the cabinet and the other end of each glide is attachable to the drawer. The drawer glides are extendable, preferably through three telescoping sections, to allow the drawer to be moved well outside the front profile of the cabinet. When fully expanded, the drawer glides position the drawer with the scale sufficiently far from the cabinet to permit space for a person to stand on the scale to be weighed, without interference with the cabinet. An alternative embodiment of the invention includes an electrical motor and drive assembly connected to a telescoping rod or tube, whereby activation of the motor extends and retracts the telescoping rod or tube, and whereby the end of the rod or tube is connected to the slidable drawer.

It is a principal object and advantage of the present invention to provide a drawer for holding a scale used for measuring a person's weight, occupying a storage position in the otherwise unused space in a cabinet base.

It is another object and advantage of the present invention to provide a scale storage drawer which can be moved conveniently into a storage space beneath a cabinet which is otherwise unused and wasted space.

It is a further object of the alternative embodiment of the invention to provide a scale drawer which is openable and closeable by operation of an electrical motor drive system.

Other and further objects and advantages of the invention will become apparent from the following specification and claims and with reference to the appended drawings.

BRIEF DESCRIPTION OF THE DRAWINGS

FIG. 3 shows a side elevation view of the invention in retracted position with a cabinet shown in cross section;

FIG. 4 shows the same side elevation view of the invention, with the drawer in extended position.

DESCRIPTION OF THE PREFERRED EMBODIMENT

Figure 1:
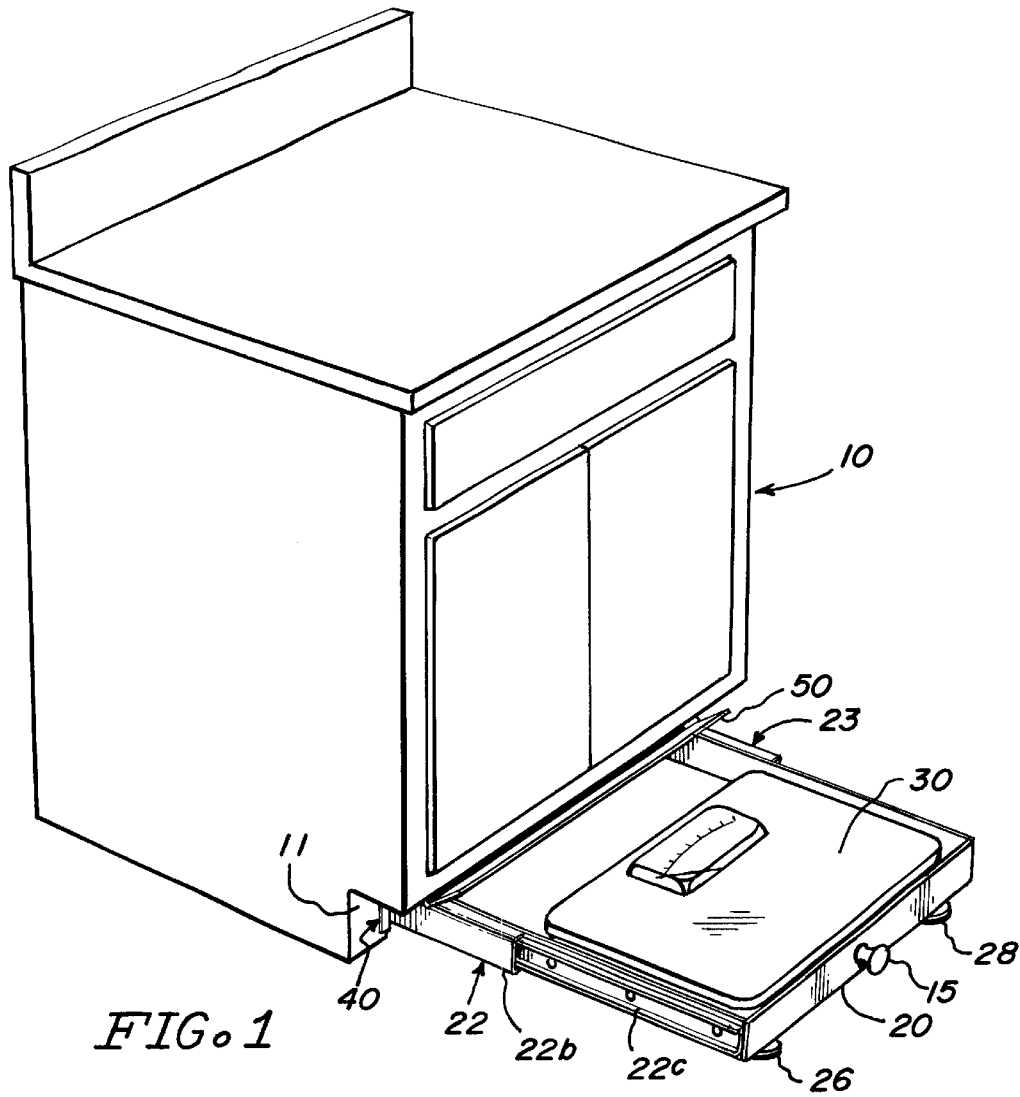
FIG. 1 shows an isometric view of a conventional cabinet with the invention shown in an extended position.

Referring first to FIG. 1, an isometric view of a typical cabinet 10 is shown, with the invention shown in a mounted position, and with the drawer 20 extended. The drawer 20 is mounted to a pair of telescoping drawer glides 22, 23, which are commercially available and operate by using nestable sections which are slidable inside one another. For example, glide 22 has an outer section 22a (see FIGS. 2–4), an intermediate section 22b, and an interior section 22c, all of which side relative to one another. Section 22a is affixed at one end to a drawer housing 40, and section 22c is affixed to drawer 20. The glide sections are designed with interlocks between the various sections to prevent the sections from completely withdrawing from one another and separating.

Referring first to FIG. 1, an isometric view of a typical cabinet 10 is shown, with the invention shown in a mounted position, and with the drawer 20 extended. The drawer 20 is mounted to a pair of telescoping drawer glides 22, 23, which are commercially available and operate by using nestable sections which are slidable inside one another. For example, glide 22 has an outer section 22a, an intermediate section 22b, and an interior section 22c, all of which slide relative to one another. Section 22a is affixed at one end to a drawer housing 40, and section 22c is affixed to drawer 20. The glide sections are designed with interlocks between the various sections to prevent the sections from completely withdrawing from one another and separating.

A scale 30 is mounted inside drawer 20 as shown, preferably with sufficient clearance around the perimeter of scale 30 so as not to interfere with the function and operation of the scale 30. Drawer 20 has a pair of adjustable feet 26, 28 attached to its underside, to provide support for the drawer when a person is standing on scale 30. The feet are individually adjustable by a threaded mounting screw, so as to provide a means for leveling the drawer against the floor when in use. Optionally, a handle 15 may be attached to the front of drawer 20 to assist in opening the drawer.

Figure 2:
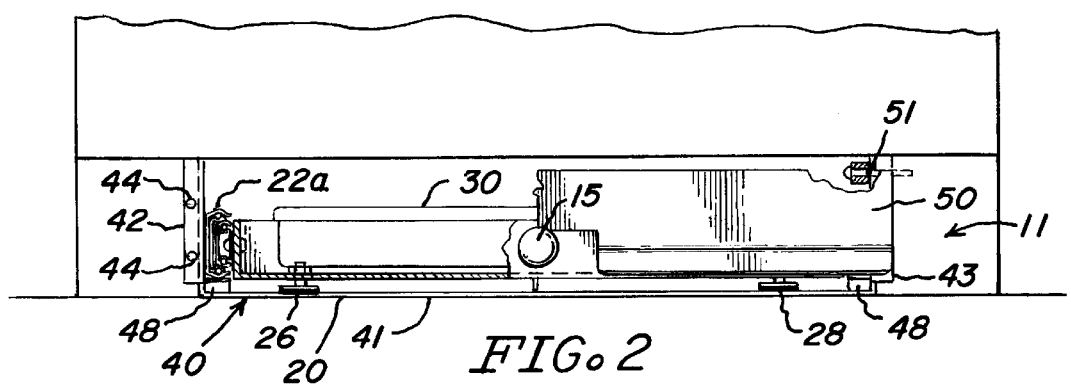
FIG. 2 shows a front elevation view of the invention in partial breakaway view.

FIG. 2 shows a front elevation view of the invention with portions of a hinged door 50 removed for clarity. Door 50 is pivotal about a hinge pin 51 on either side of the door 50. Each hinge pin 51 is pivotally mounted through a corresponding opening in the drawer housing 40. In an alternative construction, door 50 could also be hinged along a bottom edge, as with a piano hinge or similar device, and in such construction the door 50 would pivot downwardly, and drawer 20 would slide over the top of the door 50.

The drawer glide section 22a is attached at its interior end to drawer housing 40. Drawer housing 40 has a bottom surface 41 which rests on spring 48, and has a pair of parallel upstanding side walls, each of which have a front flange (42, 43) which extends outside the opening in the cabinet base 11. Each flange has openings 44 for accepting fasteners to secure the drawer housing 40 to the cabinet base 11.

FIG. 3 shows a side elevation view of the invention, retracted into the volume of cabinet base 11. Cabinet 10 and drawer housing 40 are each shown in partial cutaway for clarity. The attachment fastener 25 is shown, which attaches the rear edge of glide section 22a to drawer housing 40, and permits a limited degree of pivotal motion of drawer 20. Drawer glides 22a and 23a each rest on leaf springs 48, which have sufficient stiffness to support the front end of drawer 20 in an elevated position when the drawer is retracted. FIG. 4 shows the same view, with the drawer 20 opened. The leaf springs 48 become compressed and flattened when the drawer 20 is opened and a person stands on the scale 30; otherwise, the spring force of leaf springs 48 is sufficient keep the feet 26, 28 raised from the floor as the drawer opens and closes.

Figure 5:
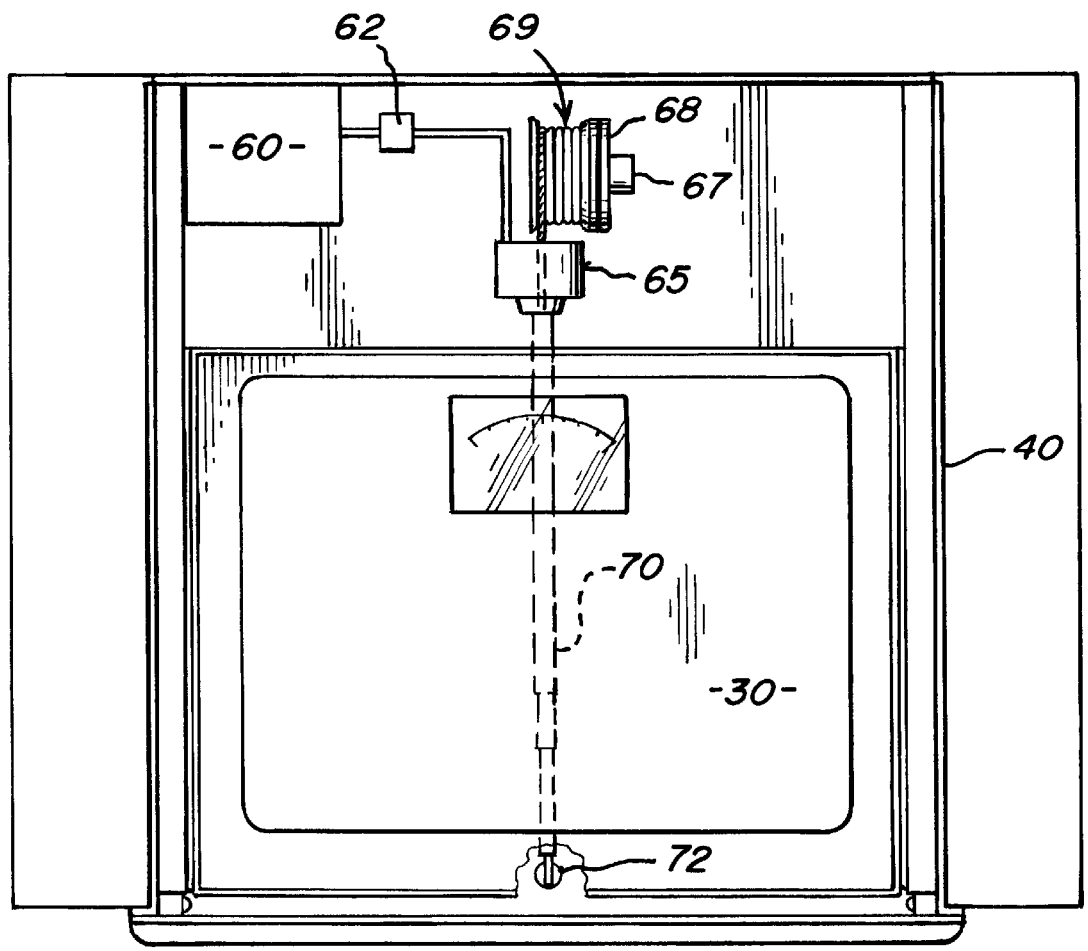
FIG. 5 shows a top view of an alternate embodiment of the invention.

FIG. 5 shows an alternative embodiment of the invention, wherein the drawer 20 may be retracted and extended under electrical control. The alternative shown is intended to be representative, it being understood that other forms of electro-mechanical drive may be contemplated to accomplish this function. A low voltage power supply 60 is mounted to drawer housing 40; power supply 60 may be a 12-volt transformer for converting 120-volt AC power input (not shown) to 12-volt AC output, which is connected to a conventional rectifier circuit 62. Rectifier circuit 62 produces a 12-volt DC output voltage which is connected to a 12-volt DC motor 65. Motor 65 is mechanically connected to drive a cable reel 68 by rotary motion. A length of flexible cable 69 is wound around cable reel 68; the end of cable 69 being connected to a telescoping tube 70 at connection 72. When voltage is applied to motor 65, cable reel 68 is caused to rotate, and cable is unwound from cable reel 68, causing telescoping tube 70 to extend. As telescoping tube 70 extends, drawer 20 is caused to open by virtue of the mechanical connection 72. Cable reel 68 is equipped with a safety clutch 67, which has a switch to disconnect the power to motor 65 whenever sufficient resistance to motion is detected. Motor 65 is a reversible motor, and an external power switch (not shown) can be switched to turn the motor on in either direction. Experimentation has shown that a commercially available automobile power antenna assembly can be used to perform the functions described herein, by connecting the telescoping antenna at point 72, and using the commercial antenna motor and cable reel assembly to operate as described herein. The antenna assembly typically includes a four-section telescoping tubular antenna body connected to a cable and reel assembly as described herein. The electrical and mechanical components will readily fit within the volume provided, including the drawer and drawer housing mechanism.

In operation, whether manual or electrical, the drawer is pulled outward from its protected storage position with the cabinet base, until the scale is fully positioned away from the cabinet. The user may then step on the scale to be weighed, and when finished with the weighing operation, simply move the drawer back under the cabinet base for further storage.

The present invention may be embodied in other forms without departing from the spirit or essential attributes thereof; and it is, therefore, desired that the present embodiment be considered in all respects as illustrative and not restrictive, reference being made to the appended claims rather than to the foregoing description to indicate the scope of the invention.

What is claimed is:

1. An apparatus for holding a scale beneath a cabinet base and positioning said scale in either an operating position or a storage position, comprising:

a) a drawer housing having a base plate and a pair of parallel upstanding side walls, said side walls having respective flanges having means for attachment to said cabinet base;

b) a pair of drawer glides in said drawer housing, each drawer glide respectively pivotally attached at a rear end to one of said side walls; said drawer glides each having a plurality of telescopic sections;

c) a drawer in said drawer housing, each of said drawer glides having a forwardmost telescopic section attached to said drawer; whereby said drawer may be extended and retracted relative to said drawer housing; said drawer being sized to hold a scale; and d) a pair of adjustable feet attached to said drawer, said feet providing support for said drawer when in the extended position.

2. The apparatus of claim 1, further comprising spring means between said drawer and said drawer housing base plate, said spring means having a spring force sufficient to lift said feet into a raised position when the drawer is retracted, and to permit the feet to contact a floor when the drawer is extended.

3. The apparatus of claim 2, further comprising a door hinged between said drawer housing side walls, said door being pivotal to permit the movement of said drawer from said drawer housing.

4. The apparatus of claim 3, further comprising an electrical motor in said drawer housing, and a cable reel and cable wound about said reel in said housing, said motor connected to rotate said cable reel to extend and retract cable from said reel; and further comprising a telescoping tube in said drawer housing, one end of said tube connected to said drawer, and the other end of said tube fixedly positioned to receive cable from said cable reel; whereby electrical operation of said motor causes cable to wind and unwind from said reel, causing said telescoping tube to extend and retract, and said drawer to move outwardly and inwardly.

5. The apparatus of claim 4, wherein said tube further comprises an automobile antenna section.

6. The apparatus of claim 4, wherein said electrical motor, cable reel and telescoping tube further comprise an automobile power antenna assembly.

7. A scale storage drawer adapted for moving outwardly and inwardly from beneath a cabinet, comprising:

a) a drawer housing having a base plate and upstanding side walls; two of said side walls having respective flanges for attaching to a base of said cabinet;

b) a pair of drawer glides, each respectively pivotally attached at a rear end to one of said side walls; each of said drawer glides having a plurality of telescopic sections, with a forwardmost section having means for attachment to a drawer;

c) a drawer mounted between said drawer glides, said drawer being attached to said forwardmost sections;

d) at least one leaf spring mounted beneath said drawer and having a spring force sufficient to raise the forwardmost part of said drawer; thereby pivoting said drawer glides upwardly; and e) means for moving said drawer outwardly away from beneath said cabinet, and inwardly into a storage position beneath said cabinet.

8. The apparatus of claim 7, further comprising a hinged door pivotally mounted between two of said drawer housing upstanding side walls, said door having an open position for permitting said drawer to move outwardly from beneath said cabinet.

9. The apparatus of claim 8, wherein said means for moving said drawer further comprises an electrical motor and mechanical drive assembly mounted in said drawer housing, said mechanical drive assembly operative in response to activation of said motor to mechanically move said drawer inwardly and outwardly.

10. The apparatus of claim 9, wherein said mechanical drive assembly further comprises a telescopic tube having a first end connected to said drawer and a second end fixedly positioned, and further comprising a cable and cable reel mounted to feed cable into said second end, and further comprising a rotary drive connector between said electric motor and said cable reel.

11. The apparatus of claim 10, wherein said rotary drive connector further comprises a mechanical clutch between said cable reel and said electrical motor.

12. The apparatus of claim 11, wherein said electrical motor further comprises a DC motor capable of being energized to rotate in either of two directions.

13. The apparatus of claim 12, further comprising a low voltage transformer mounted in said drawer housing, and a rectifier circuit mounted in said drawer housing, said transformer and rectifier being sized for converting 110 volt AC current to 12 volt DC current.

* * * * *

UNITED STATES PATENT AND TRADEMARK OFFICE
CERTIFICATE OF CORRECTION

PATENT NO.     : 6,371,584 B1
DATED          : April 16, 2002
INVENTOR(S)    : Oden R. Alreck It is certified that error appears in the above-identified patent and that said Letters Patent is hereby corrected as shown below:

<u>Column 2,</u>
Line 10, insert -- Referring to the drawing figures, it should be understood that the apparatus shown in each figure illustrates components which are not necessarily drawn to scale. In the figures, like reference characters refer to the same or functionally similar parts of the respective features illustrated in each of the figures. --
Delete lines 23 through 36.

Signed and Sealed this

Eighteenth Day of June, 2002

*Attest:*

*Attesting Officer*

JAMES E. ROGAN
*Director of the United States Patent and Trademark Office*